United States Patent

Mercier et al.

[15] 3,675,684

[45] July 11, 1972

[54] PRESSURE VESSEL

[72] Inventors: Jacques H. Mercier, Paris; Fernand Copine, Cergy; Carlo Corbellini, Paris, all of France

[73] Assignee: Olaer Patent Company, Grand Duchy, Luxembourg; by said Copine and Corbellini

[22] Filed: March 4, 1970

[21] Appl. No.: 16,353

[30] Foreign Application Priority Data

March 18, 1969 France.................................6907649

[52] U.S. Cl................................................138/30
[51] Int. Cl.................................................F16l 55/04
[58] Field of Search...................92/98, 103; 137/207, 564.5; 138/26, 30; 251/61, 61.2, 331, 358

[56] References Cited

UNITED STATES PATENTS

| | | |
|---|---|---|
| 3,220,594 | 11/1965 | Ortheil et al........................138/30 X |
| 3,461,530 | 8/1969 | Cadiou...............................138/30 X |
| 2,630,834 | 3/1953 | Weber et al..........................138/30 |
| 2,801,067 | 7/1957 | Mercier...............................138/30 X |
| 2,300,722 | 11/1942 | Adams et al..........................92/98 X |
| 3,420,273 | 1/1969 | Greer.................................138/30 |

FOREIGN PATENTS OR APPLICATIONS

| | | |
|---|---|---|
| 913,487 | 5/1946 | France................................138/30 |

*Primary Examiner*—Edward J. Earls
*Attorney*—Arthur B. Colvin

[57] ABSTRACT

The present invention relates to a pressure reservoir having a rigid container with a deformable bladder therein dividing the container into two variable volume chambers, each adapted to receive fluid under pressure. A port is provided in communication with one of said chambers and valve means are associated with said port to close the latter. The valve means is controlled by deformation of the bladder upon expansion thereof when fluid is discharged through said port. The valve means is conformed so that a suction effect will be created due to the flow of fluid through said port, which will cause the valve means accurately to center on a fixed seat associated with the port to close the latter and prevent extrusion of the bladder.

5 Claims, 7 Drawing Figures

INVENTORS
JACQUES H. MERCIER
FERNAND CORNE
CARLO CORBELLINI

By *Arthur B. Colvin*
ATTORNEY

INVENTORS
JACQUES H. MERCIER
FERNAND COPINE
CARLO CORBELLINI
BY
ATTORNEY

PRESSURE VESSEL

As conducive to an understanding of the invention, it is noted that in pressure vessels of the above type where the valve member is either mounted in the port of the container or carried by the bladder, it is essential that the valve member when moved against its seat to close such port, do so in manner to preclude extrusion of the bladder into such port which would cause cutting of the bladder upon full closure of the valve member with resultant rupture thereof and failure of the pressure reservoir.

It is accordingly among the objects of the invention to provide a pressure reservoir of the above type in which a movable valve member controlling the oil port will dependably close to cut off discharge of fluid, with assurance that the bladder will not be extruded through the port and be cut or ruptured by the closing movement of the valve member.

According to the invention the pressure reservoir has a bladder therein which is initially charged with gas under pressure and subsequently compressed or deformed by admission of a fluid such as oil under pressure through an associated port. A valve member is associated with said port and designed to be moved by the bladder against a seat encompassing said port upon expansion of the bladder. The valve member is conformed so that it has a concavity in its undersurface which, as a result of the rapid flow of fluid from the port, will cause a suction to be developed, thereby quickly moving the valve member against its seat and centering the valve member for dependable closing action, prior to movement of the portion of the bladder adjacent the valve member into the port, thereby preventing extrusion of such bladder.

In the accompanying drawings in which is shown one or more of various possible embodiments of the several features of the invention;

Figure 1:
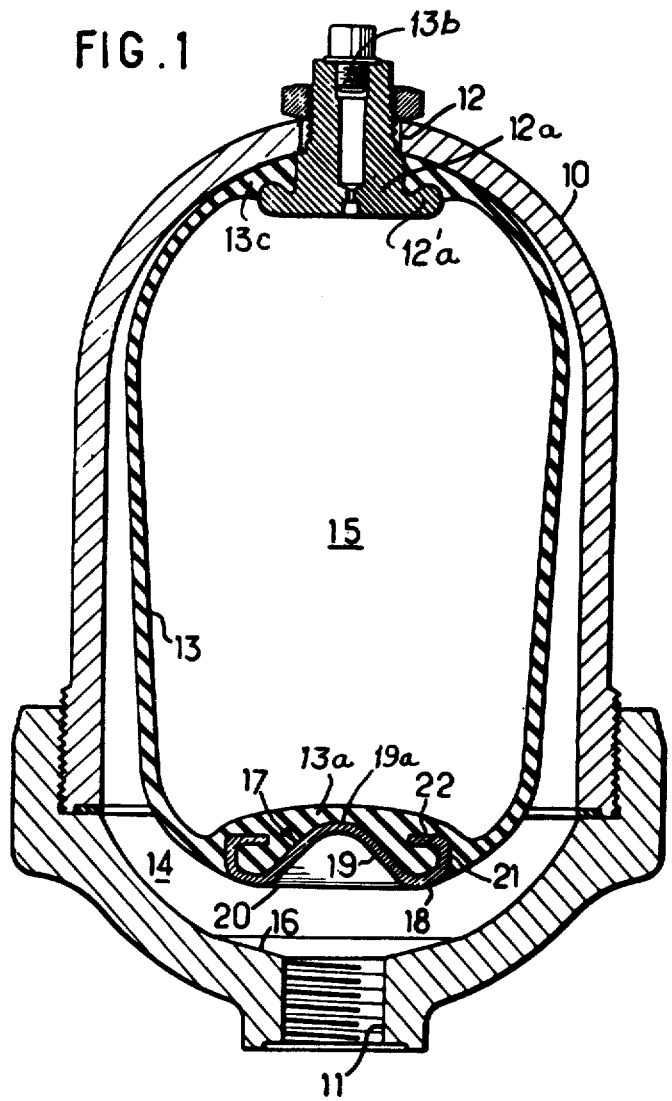
FIG. 1 is a longitudinal sectional view of a pressure vessel according to the invention, the valve member being separated from the seat.
Figure 2:
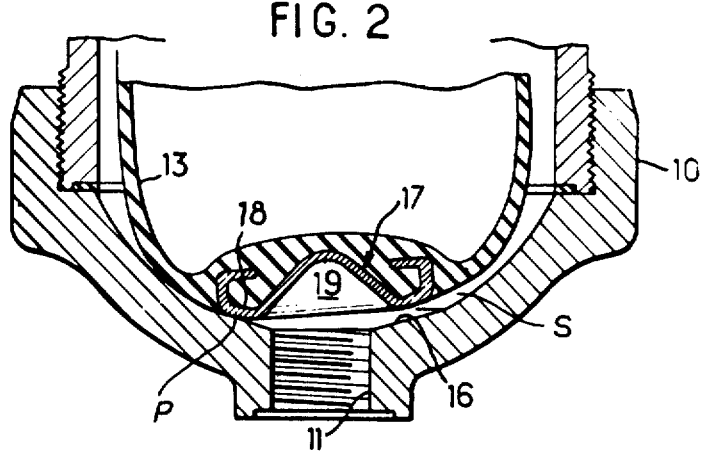
FIG. 2 is a fragmentary detail view similar to FIG. 1 in which the valve member occupies an intermediate position.
Figure 3:
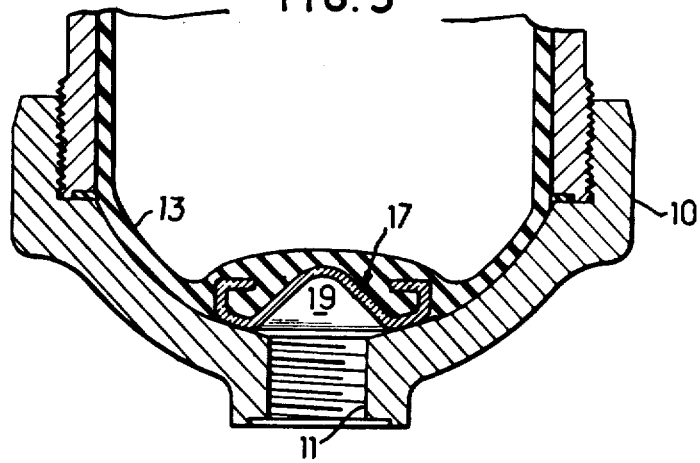
FIG. 3 is a view similar to FIG. 2, but corresponding to the position of complete closing.

Referring to FIGS. 1 to 3, the pressure vessel, according to the invention, illustratively is a pressure accumulator having a rigid container 10 of steel, aluminum or the like with two opposed fluid ports 11 and 12. A deformable separator or partition 13 comprising, for example, a bladder of elastic material, is positioned in the container 10 and divides the interior space of the latter into two chambers 14 and 15 having variable volumes. Chamber 14 communicates with port 11 while chamber 15 communicates with port 12.

More particularly, chamber 14 is adapted to receive a fluid such as oil and port 11 is adapted to be connected to a hydraulic installation. Chamber 15 is filled by a gaseous fluid such as air or nitrogen under pressure and port 12 mounts a fitting 12a, the bore of which receives a gas inlet valve 13b in communication with chamber 15, the valve 13b being for example a conventional Schraeder valve which is normally closed. The mouth 13c of the bladder 13 is secured to the flange 12'a of the fitting 12a.

Means are provided to close the port 11 in response to expansion of the bladder 13 which tends to reduce or eliminate the volume of chamber 14. To this end the port 11 has a fixed seat 16 which is formed by the inside wall of the container 10 around the port 11 and a movable closing element or valve member 17 is provided, carried by bladder 13.

According to the invention, the valve member 17 is substantially cup-shaped, the side wall 21 thereof having an inwardly extending annular flange 22. The floor of the valve member 17 has a concavity therein, in the form of an inverted cone 19, the apex 19a of which is rounded as shown and illustratively extends beyond the plane of the annular flange 22. The junction between the lower edge of side wall 21 and the base 20 of the inverted cone 19 is rounded as at 18 and defines an annular closure portion of diameter greater than that of port 11, so that such closure portion 18 may be moved against annular seat 16 to close port 11 as shown in FIG. 3.

Illustratively, the diameter of the concavity 19 taken at the annular closure portion 18 is between two and three times the height of the concavity 19 and preferably approximately two and one-half times such height. The diameter of the annular closure portion 18 is between 120 and 160 percent of the diameter of port 11 and preferably 140 percent of such diameter.

As shown in FIG. 1, for example, the valve member 17 is preferably molded integrally with the closed end 13a of the bladder 13 and is axially aligned therewith, the apex 19' of the valve member 17 being directed upwardly as shown.

To charge the pressure accumulator hereinabove described, the port 11 is connected to a hydraulic installation and gas under pressure is admitted through valve 13b into the chamber 15 defined by bladder 13 to charge the latter which will expand, substantially to assume the contour of the inner wall of the container 10 and valve member 17 will seal as shown in FIG. 3 to close port 11.

A valve (not shown) interposed between the port 11 and the hydraulic installation is opened, so that oil under pressure will flow through port 11 into chamber 14 and compress the gas in bladder 13, moving valve member 17 off its seat 16 and opening port 11. The device is then in operating condition.

In operation of the pressure accumulator, the oil contained in the chamber 14 will be forced through port 11 into the hydraulic installation under the effect of the gas under pressure in bladder 13. As this occurs, the chamber 14 will empty and the annular closure portion 18 of valve member 17 will move onto the seat 16 in order to close the port 11 to prevent extrusion of the bladder 13.

The concavity 19, according to the invention, provides for a proper operation as well as correct closing, and this, whether the outflow of liquid from chamber 14 through port 11 is large or small.

When the volume of this outflow is large, the concavity 19 has the effect of creating a low pressure zone therebeneath, which produces a suction that provides a self-centering effect of the valve member 17 with respect to the port 11, and the valve member 17 is applied and exactly centered by its rounded annular closure portion 18 upon the seat 16 in the closed position (FIG. 3).

When the volume of liquid outflow is small, and since the bladder 13 may have a more or less pronounced dis-symmetry due to its construction, there may occur a first contact of the closure portion 18 of valve member 17 with the seat 16 in a localized region serving as a balancing point P (FIG. 2.).

In the space S existing between the valve member 17 and the seat 16 opposite the balancing point P, there occurs a layering flow of the oil and by reason of the concavity 19 which causes a turbulence generating a low pressure area, there is a self-centering effect which brings the valve member from the ajar balancing position of FIG. 2 to the position of complete closing, properly centered, of FIG. 3.

The concavity 19, according to the invention, has in addition, the effect, in case of a break in the line of the hydraulic installation to which the port 11 is connected, which will cause an extremely rapid discharge to occur from chamber 14, and hence a large pressure drop, of causing an immediate seating of the valve member 17 upon the seat 16, in a proper self-centered position due to the suction created in the concavity 19.

In the embodiment shown in FIG. 4, the arrangement is similar to that previously described with reference to FIGS. 1 to 3, except for the configuration of the valve member 17'. Thus, the valve member 17' has substantially the shape of an inverted dish having a flat apex or top wall 24 and an outwardly flared side wall 23.

A flat disc 25 of diameter greater than that of top wall 24 is secured to the latter with the periphery 26 of the disc 25 extending laterally beyond the periphery of the wall 24 so that the valve member may be securely anchored in the closed end 13'a of the bladder 13' when molded integrally therewith.

The rim 18' of the valve member 17' defines an annular closure portion designed to move against the seat 16' to close the port 11'.

The concavity 19' of the valve member 17' has, in a plane passing through the axis thereof, a section in the form of a trapazoid, the larger base 20' of which has a diameter between 120 and 220 percent of the small base or top wall 24 and preferably near 170 percent of such diameter. The diameter of the large base 20' of the trapazoid is between 200 and 600 percent of the height of the concavity 19' and preferably nearly 400 percent of this height.

Figure 4:
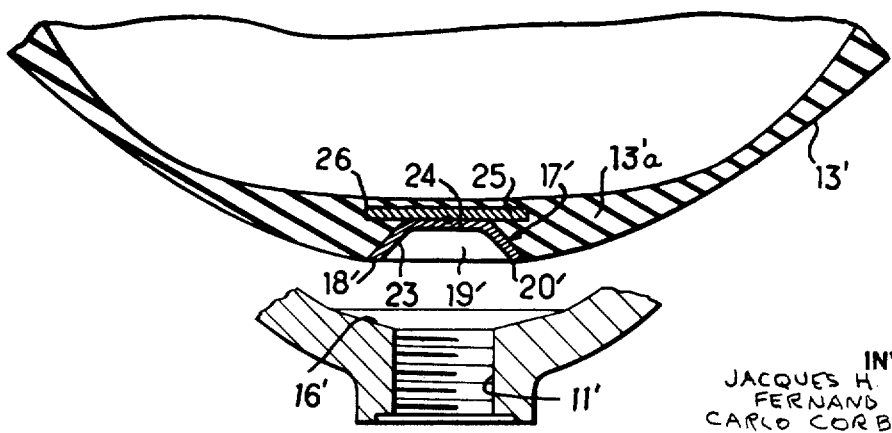
FIG. 4 is a fragmentary sectional view of another embodiment of the invention.

The operation of the valve member of FIG. 4 is similar to that which has been described with reference to the embodiment of FIGS. 1 to 3.

In the embodiments shown in FIGS. 1 to 3 and in FIG. 4, the valve member 17 or 17' is carried by the bladder 13, 13'. In the embodiment shown in FIGS. 5 to 7, the valve member 17" is separate from the bladder 13 and is mounted in the port 11" of the rigid container 10.

Figure 5:
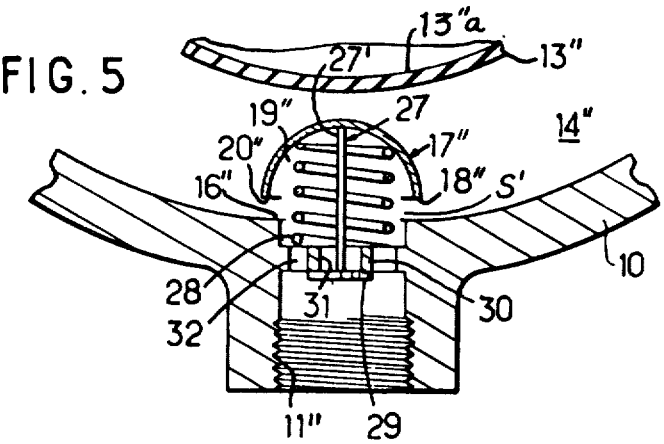
FIG. 5 is a fragmentary sectional view of still another embodiment of the invention, the closing element being represented in open position.
Figure 6:
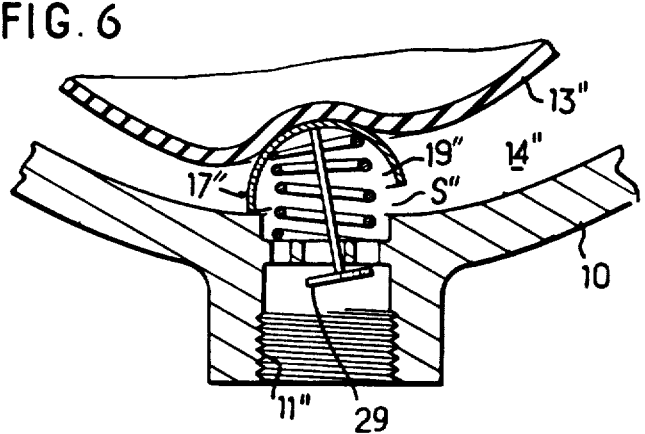
FIGS. 6 and 7 are views similar to FIG. 5 but in which the valve member occupies respectively a semi-closed and a completely closed position.
Figure 7:
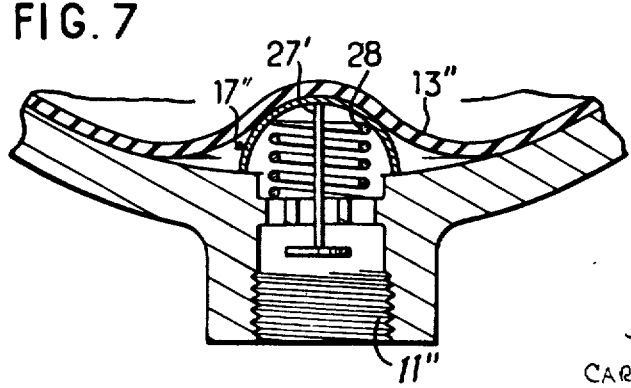

In the embodiment shown in FIGS. 5 to 7, the valve member 17" comprises a hemispherical cap, the rim of which forms the annular closure portion 18" that is movable against the seat 16", the interior of the cap defining the concavity 19".

A rod 27, secured at one end as at 27' to the interior of the cap extends outwardly therefrom, being axially aligned with the opening defined by the rim 18".

The rod 27 extends through the central opening 31 of a wall 30 extending transversely across the inner end of port 11". A coil spring 28 encompassing rod 27 and reacting against the inner surface of cap 17" and wall 30, normally urges the cap 17" inwardly, such inward movement being limited by a stop member 29 secured to the end of rod 27 and abutting against the outer surface of wall 30. The diameter of stop member 29 is such that when abutting against wall 30, it will not cover a plurality of fluid passages 32 extending through such wall 30.

The stop member may be a disc that will completely cover central opening 31 when the valve member 17" is in open position or it may have a configuration such as the shape of a cross, for example, to expose a portion of opening 31.

The length of rod 27 is such that when the stop member abuts against the outer surface of wall 30 as shown in FIG. 5, the rim or annular closure portion 18" of the valve member 17" will be inwardly spaced from seat 16".

In the open position of valve member 17", the spring 28 retains the annular closure portion 18" thereof spaced from the seat 16", which permits flow of fluid through the annular space S' provided between the closure portion 18" and the seat 16 and through the passages 32 as well as possibly through a part of the opening 31.

As the chamber 14" empties as a result of expansion of the bladder, the end 13"a of the bladder will press against the cap or valve member 17" moving the rim or closure portion 18" thereof against the seat 16" to close port 11. The concavity 19" defined by the cap 17" functions as a self-centering device similar to the concavity 19 shown in FIGS. 1 to 3. When the outflow is great, the concavity 19" produces a low pressure area having a self-centering effect assuring a properly centered closing (FIG. 7). When the outflow is small, the cap or valve member 17" is placed in a balancing position (FIG. 6), leaving a space S" generating a layering flow of the fluid, which causes a turbulence and a self-centering suction effect, which will move the valve member 17" from the position shown in FIG. 6 to the correctly centered position of complete closing of FIG. 7.

Having thus described our invention, what we claim as new and desire to secure by Letters Patent of the United States is:

1. A pressure vessel comprising a container of rigid material having two ports, one of said ports being axially aligned with the container and defining a liquid port, a deformable bladder of elastic material secured in said container separating said two ports from each other to define two variable volume fluid receiving chambers, said bladder extending axially in said container and being closed at one end, the portion of the container adjacent the periphery of said liquid port defining a valve seat, means movable against said valve seat to close said port, the closed end of said bladder being adapted to react against said movable means to actuate the latter, said movable means comprising a valve member having an annular closure portion adapted to be moved against said seat to close said liquid port, said closure member having a concavity therein facing said liquid port, said concavity in cross section being substantially conical, having its apex directed upwardly and having a base diameter greater than the diameter of said liquid port and between two and three times the height of said concavity, said concavity being subjected to the effect of liquid flow from said port to create a low pressure area in said concavity.

2. The combination set forth in claim 1 in which the diameter of the base of the concavity is two and one-half times the height of the concavity.

3. A pressure vessel comprising a container of rigid material having two ports, one of said ports being axially aligned with the container and defining a liquid port, a deformable bladder of elastic material secured in said container separating said two ports from each other to define two variable volume fluid receiving chambers, said bladder extending axially in said container and being closed at one end, the portion of the container adjacent the periphery of said liquid port defining a valve seat, means movable against said valve seat to close said port, the closed end of said bladder being adapted to react against said movable means to actuate the latter, said movable means comprising a valve member having an annular closure portion adapted to be moved against said seat to close said liquid port, said closure member having a concavity therein facing said liquid port, said concavity being in the form of an inverted dish having a substantially flat top wall and an outwardly flared side wall, the diameter of the base of said concavity being between 120 and 220 percent of the diameter of the top wall and between 200 and 400 percent of the height of said concavity, said closure member having a base diameter greater than the diameter of said liquid port, said concavity being subjected to the effect of liquid flow from said port to create a low pressure area in said concavity.

4. The combination set forth in claim 3 in which the diameter of the base of said dish-shaped concavity is substantially 170% of the diameter of the top wall and the diameter of the base of the concavity is substantially 400% of the height of the concavity.

5. A pressure vessel comprising a container of rigid material having two ports, one of said ports being axially aligned with the container and defining a liquid port, a deformable bladder of elastic material secured in said container separating said two ports from each other to define two variable volume fluid receiving chambers, said bladder extending axially in said container and being closed at one end, the portion of the container adjacent the periphery of said liquid port defining a valve seat, means movable against said valve seat to close said port, the closed end of said bladder being adapted to react against said movable means to actuate the latter, said movable means comprising a valve member having an annular closure portion adapted to be moved against said seat to close said liquid port, said valve member being substantially in the form of an inverted dish having a flat top wall and an outwardly flared side wall defining a concavity having a mouth of diameter greater than the diameter of said liquid port, a disc secured to said top wall and of diameter greater than the diameter of said top wall, said valve member being molded integrally with the closed end of said bladder and axially aligned therewith, the base of said dish-shaped member defining the annular closure, said concavity being subjected to the effect of liquid flow from said port to create a low pressure area in said concavity.

* * * * *